W. MARTIN.
Stock-Car.

No. 226,333.

Patented April 6, 1880.

WITNESSES:
W. W. Hollingsworth
Amos W. Hart

INVENTOR:
Wm Martin
BY
ATTORNEYS.

UNITED STATES PATENT OFFICE.

WILLIAM MARTIN, OF SAN FRANCISCO, CALIFORNIA.

STOCK-CAR.

SPECIFICATION forming part of Letters Patent No. 226,333, dated April 6, 1880.

Application filed February 16, 1880.

*To all whom it may concern:*

Be it known that I, WM. MARTIN, of the city and county of San Francisco, and State of California, have invented a new and Improved Stock-Car; and I do hereby declare that the following is a full, clear, and exact description of the same.

My invention relates to an improved railway-car for transporting live-stock, more especially horned cattle.

The improvement relates to the means—to wit, swinging stanchions or guards—for securing the cattle.

Figure 1:
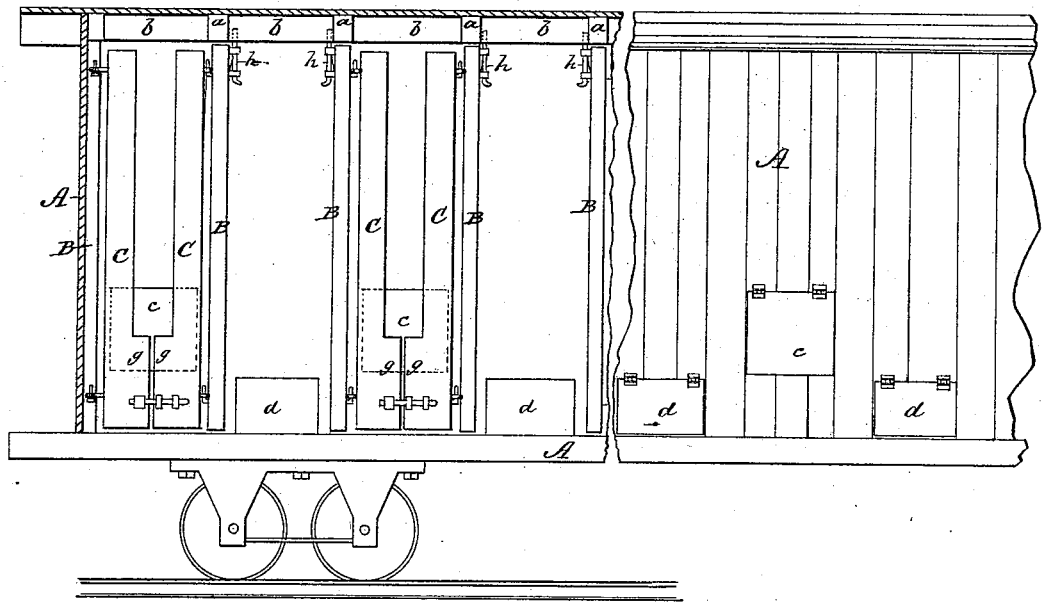
Figure 2:
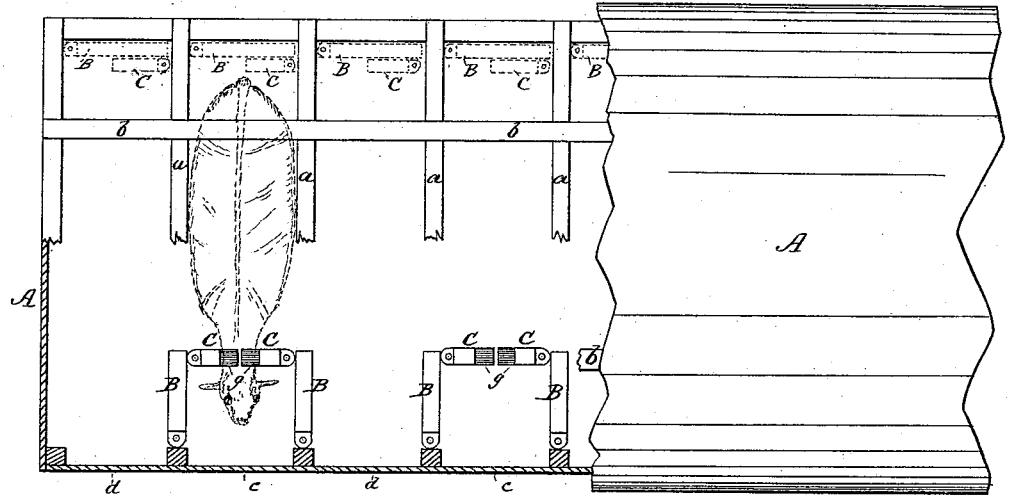

In accompanying drawings, forming part of this specification, Figure 1 is in part a sectional view and in part a side view of a portion of a car embodying my invention. Fig. 2 is a plan view, part of the car-roof being removed.

The frame or body of the car A is, in most respects, constructed like the ordinary so-called cattle-cars; but its roof-timbers $a\ b$ are differently arranged, and it is provided with small side doors, $c\ d$, for purposes hereinafter specified.

Interiorly the car A is provided on each side with a series of hinged stanchions or guards arranged in pairs. Each stanchion is composed of two parts, B C, which are jointed together, the inner one, B, being hinged to the side of the car. The outer parts, C, are the narrower, and provided with a wing, $g$, at their lower ends, so that when the stanchions B C are adjusted in the positions shown in full lines—that is to say, when the parts B are at right angles to the side of the car and the outer parts, C, parallel thereto—the wings $g$ form the front of a manger or receptacle for hay and other food. The stanchions are secured in such position by means of spring catches or bolts $h$, which may be so constructed as to automatically engage or lock with the stanchions when the latter are swung out from the side of the car. These catches are shown attached to the stanchions; but they may be secured to the car-roof instead.

The timbers $a\ b$ are arranged to cross each other at right angles, so as to correspond with the position of the parts B C of the several stanchions when adjusted for securing cattle, as shown in Fig. 1. This arrangement is important for the purpose of affording a strong and rigid frame by which the stanchions may be securely held in the normal position.

The cattle are driven into the car, one at a time, through the middle side door, (not shown,) and placed as indicated in Fig. 2—that is to say, crosswise of the car, with their heads alternately in opposite directions. Water and feed are supplied to the cattle through small side doors, $c$, and the droppings are removed through other doors, $d$.

A car thus constructed enables cattle to be fed and watered with little labor and trouble, and to be transported in comfort, and also without danger of one injuring the other, so that they may be delivered at their destination rather improved than deteriorated in condition.

To prepare the car for use in transporting merchandise, &c., on the return trip, the stanchions may be swung back or folded against the sides of the car, as shown in dotted lines, Fig. 2, or they may be detached and removed altogether; but in the latter case the hinges require to be constructed with special reference to such detachment.

What I claim is—

1. In a stock or cattle car, the combination of stanchions, each composed of the folding hinged parts B C, and devices for securing them in the angular position shown and described.

2. In a stock or cattle car, the combination, with the side of the car, of the stanchions composed of the parts B and C, hinged together, and the latter having the bottom wings, $g\ g$, as and for the purpose specified.

WILLIAM MARTIN.

Witnesses:
A. H. MARTIN,
C. P. LINCOLN.